Figure 1:
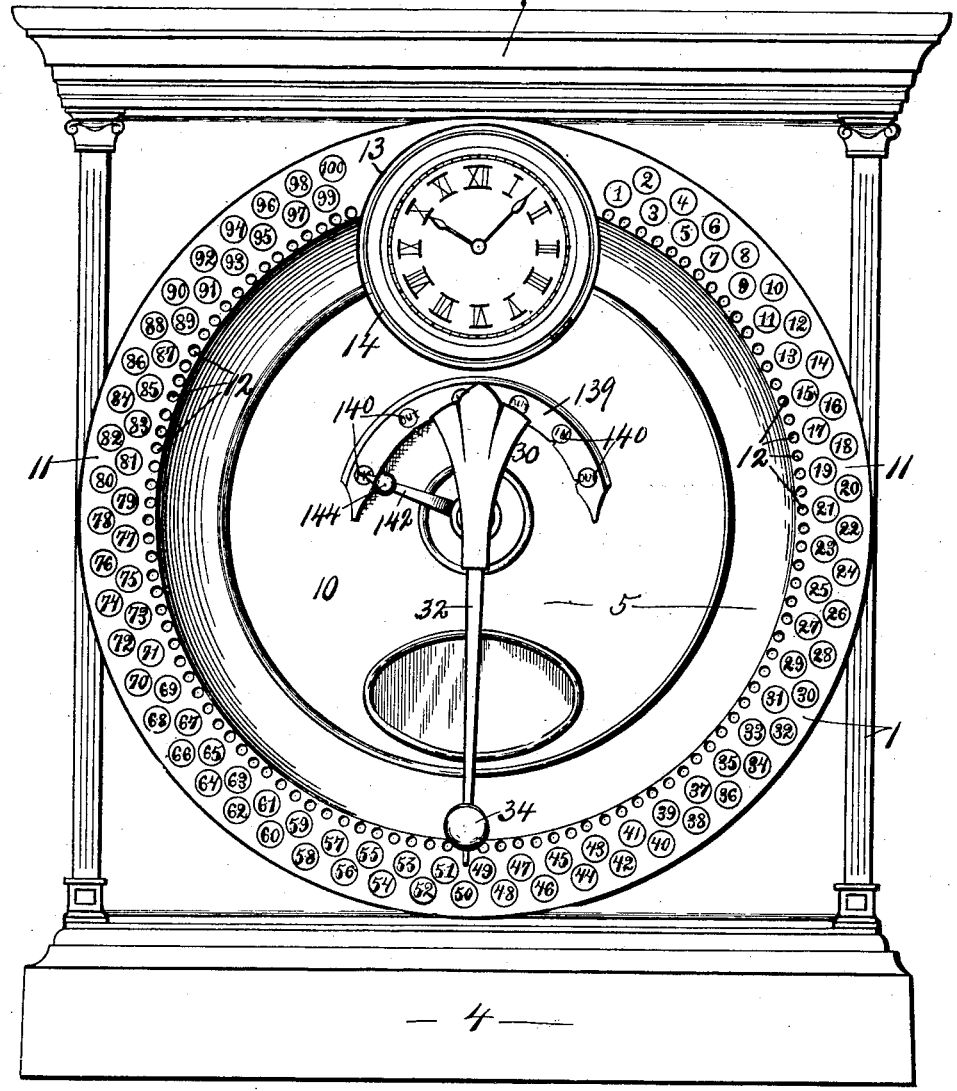

No. 738,454. PATENTED SEPT. 8, 1903.
W. W. KIMBALL & A. N. PALMER.
TIME RECORDER.
APPLICATION FILED SEPT. 11, 1901.
NO MODEL. 10 SHEETS—SHEET 1.

WITNESSES:
INVENTORS
William W. Kimball and
Anson N. Palmer.
BY
Smith & Denison
ATTORNEYS.

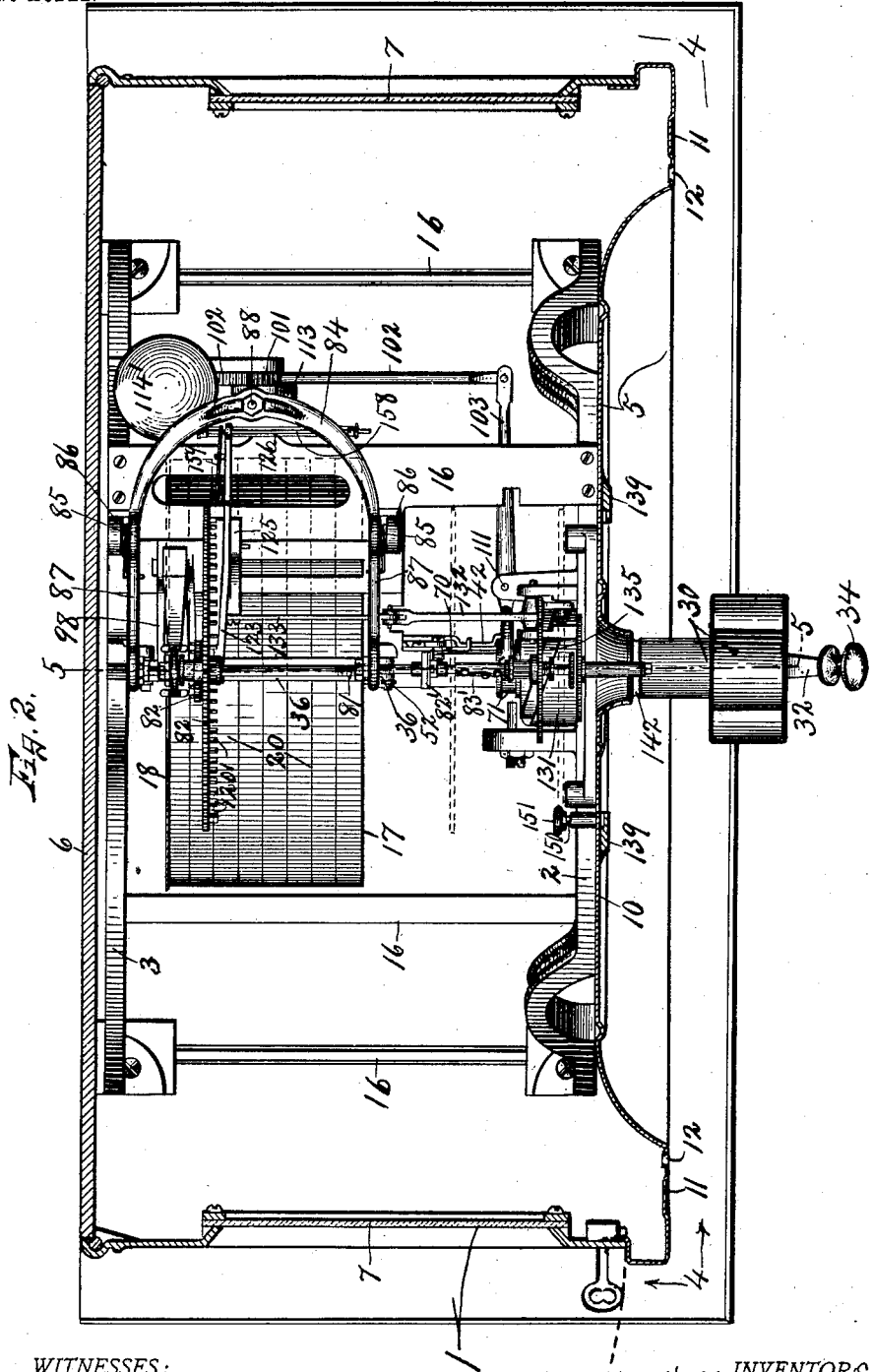

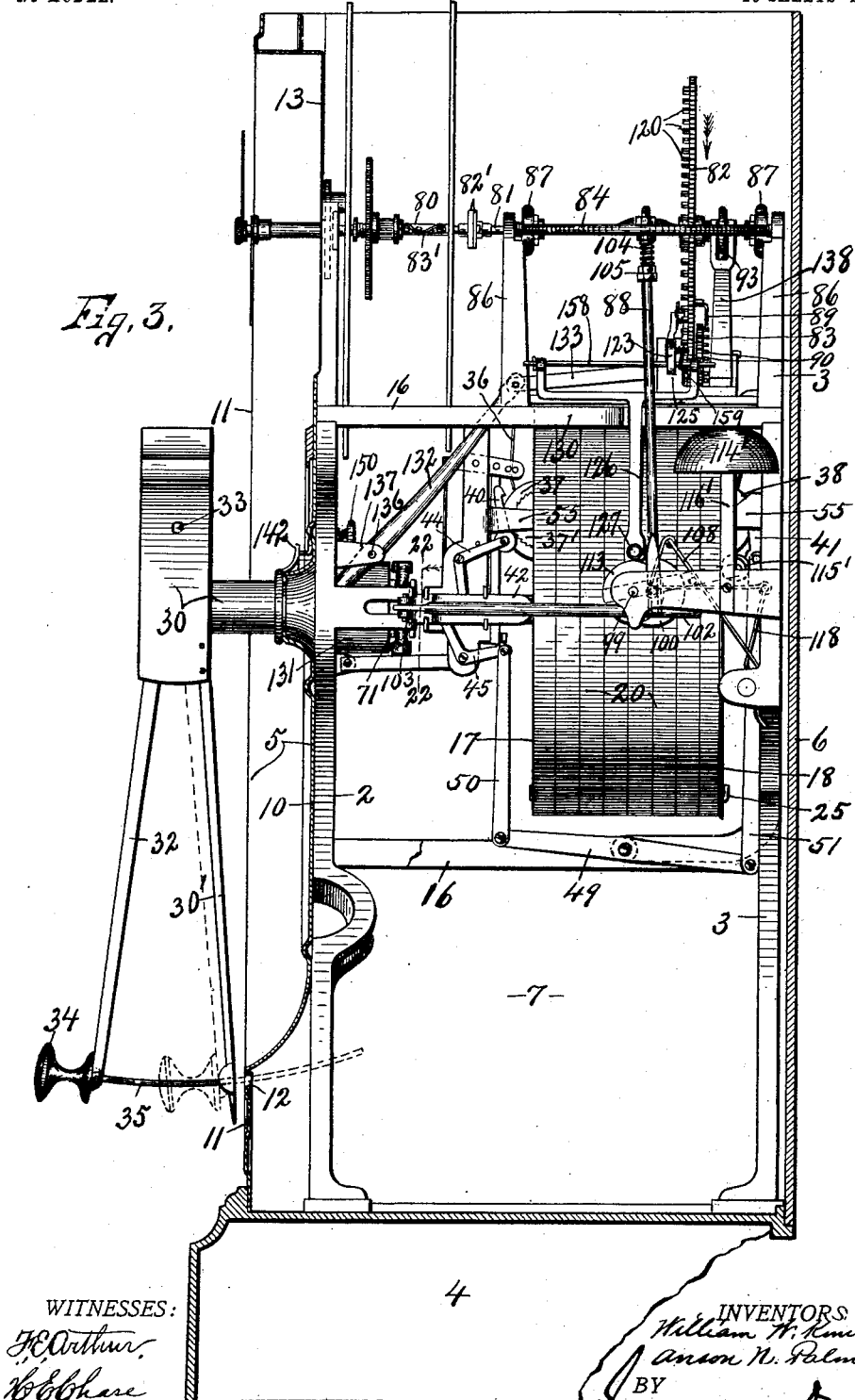

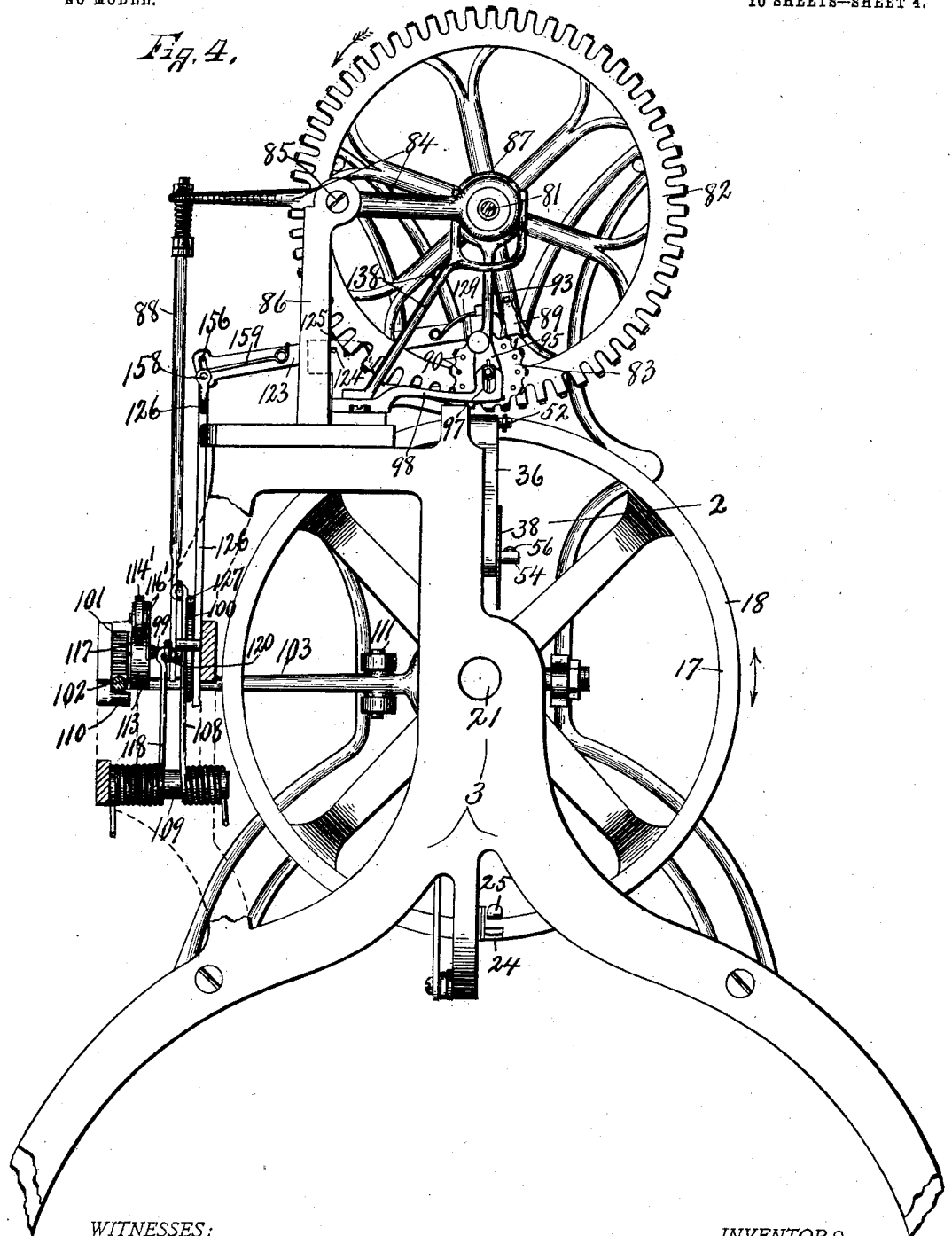

No. 738,454. PATENTED SEPT. 8, 1903.
W. W. KIMBALL & A. N. PALMER.
TIME RECORDER.
APPLICATION FILED SEPT. 11, 1901.
NO MODEL. 10 SHEETS—SHEET 5.
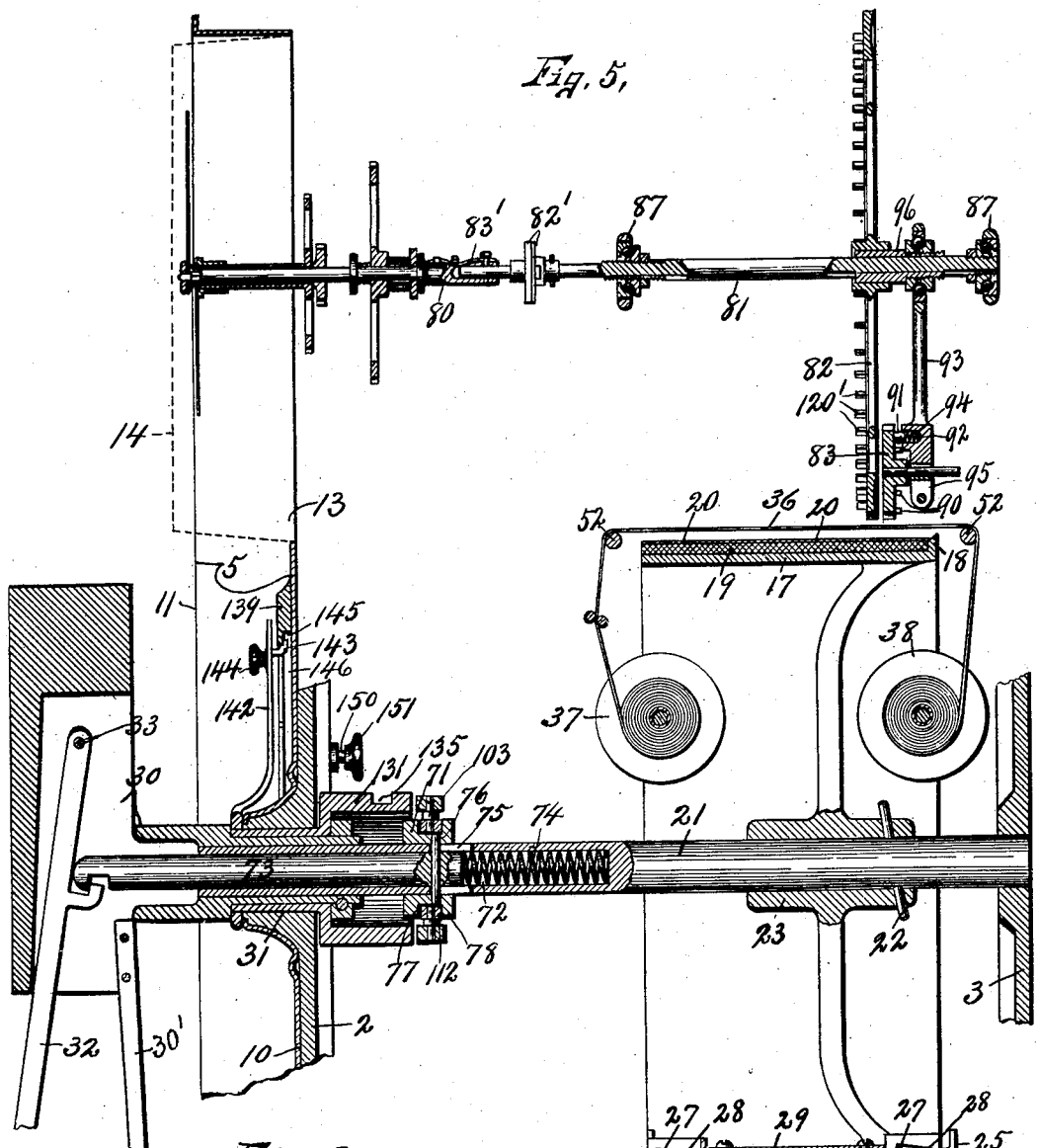
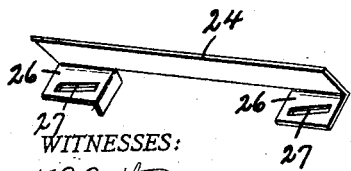
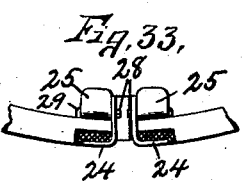
WITNESSES:
INVENTORS
William W. Kimball and
Anson N. Palmer
BY Smith & Denison
ATTORNEYS.

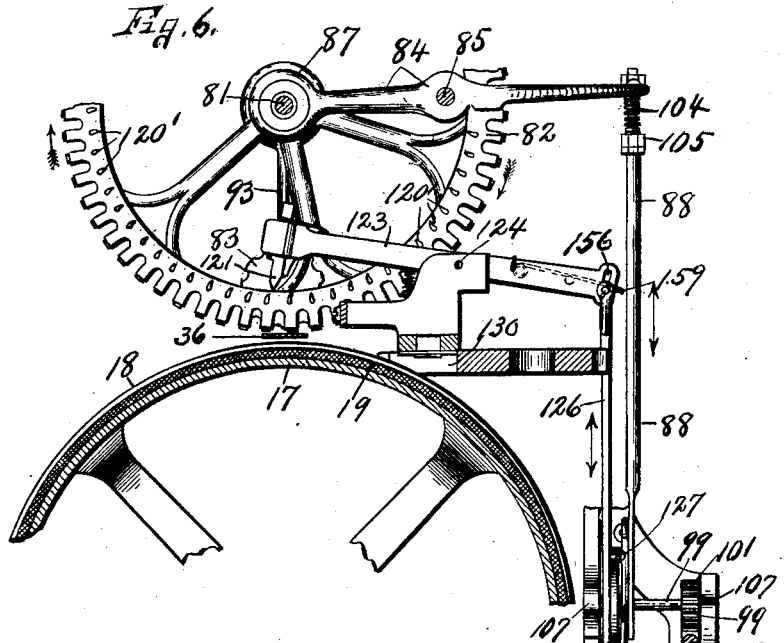

No. 738,454. PATENTED SEPT. 8, 1903.
W. W. KIMBALL & A. N. PALMER.
TIME RECORDER.
APPLICATION FILED SEPT. 11, 1901.
NO MODEL. 10 SHEETS—SHEET 7.
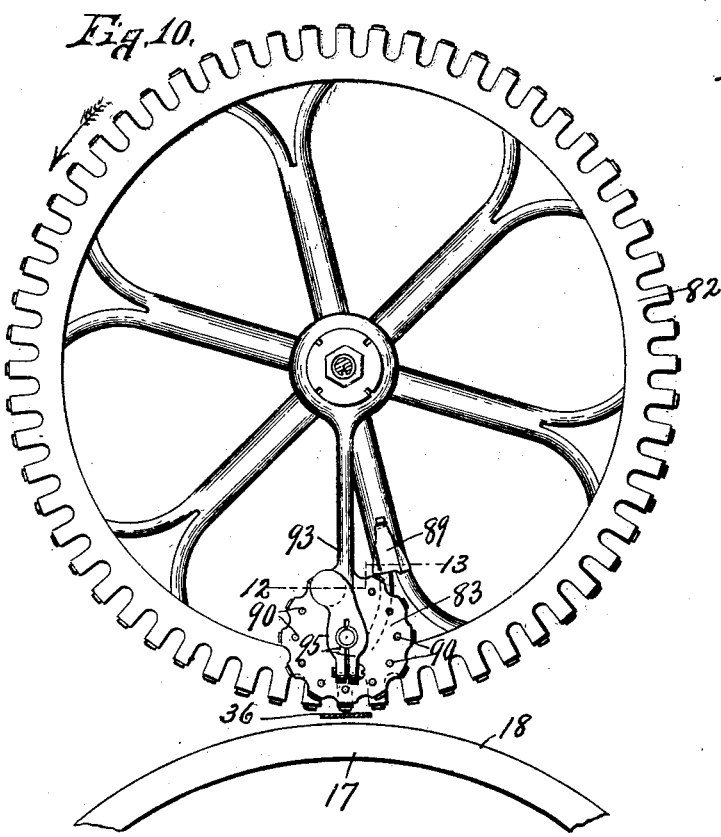
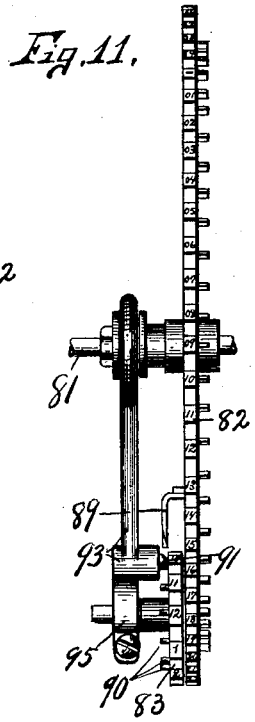
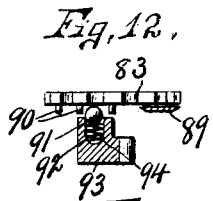
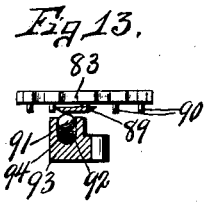
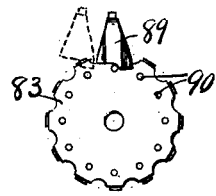
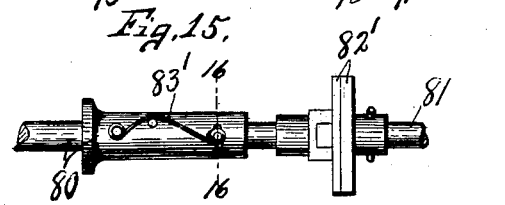
WITNESSES:
F. C. Arthur
H. E. Chase
INVENTORS
William W. Kimball and
Anson N. Palmer
BY
Smith & Denison
ATTORNEYS.

No. 738,454. PATENTED SEPT. 8, 1903.
W. W. KIMBALL & A. N. PALMER.
TIME RECORDER.
APPLICATION FILED SEPT. 11, 1901.
NO MODEL. 10 SHEETS—SHEET 8.
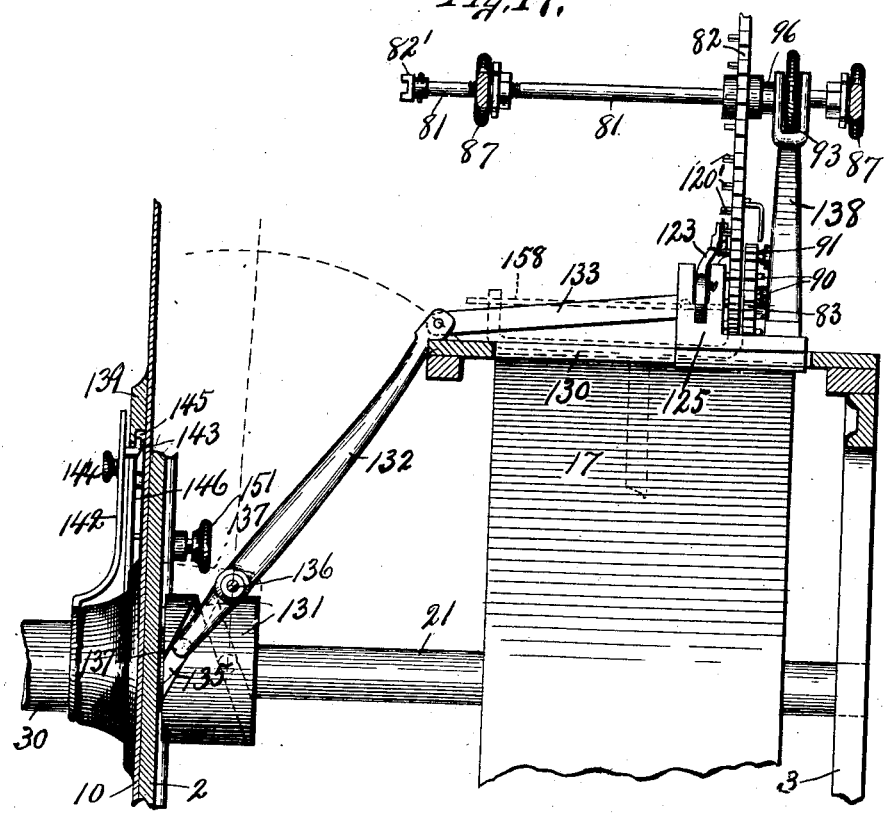
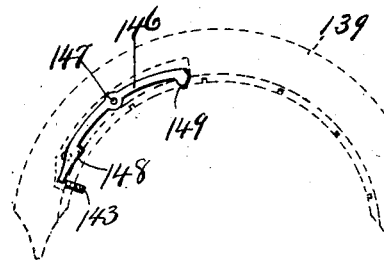
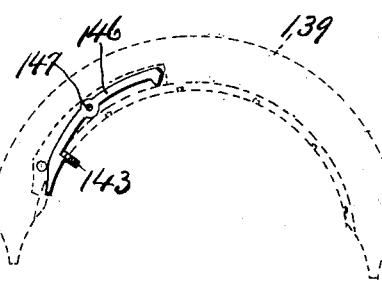
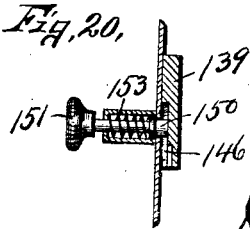
WITNESSES:
INVENTORS
William W. Kimball and
Anson N. Palmer
BY
Smith & Denison
ATTORNEYS.

No. 788,454. PATENTED SEPT. 8, 1903.
W. W. KIMBALL & A. N. PALMER.
TIME RECORDER.
APPLICATION FILED SEPT. 11, 1901.
NO MODEL. 10 SHEETS—SHEET 9.
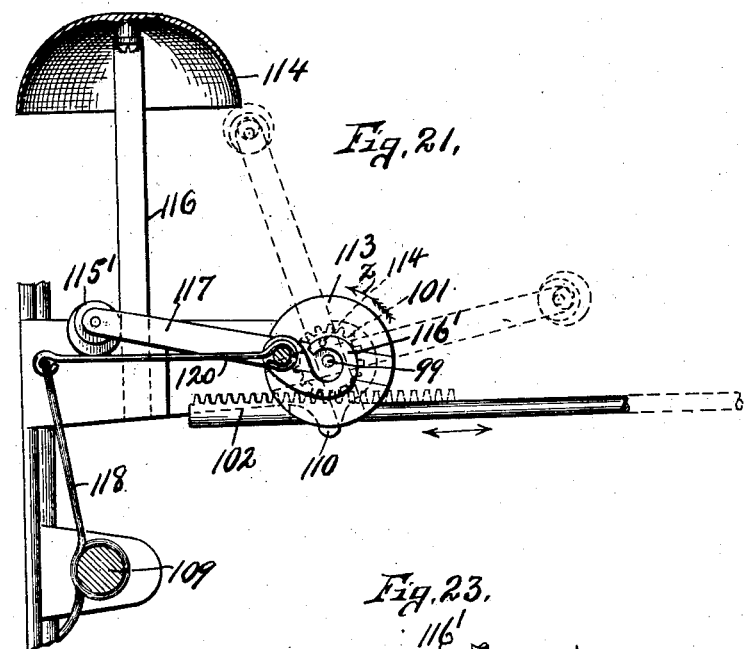
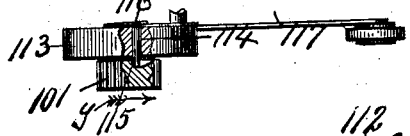
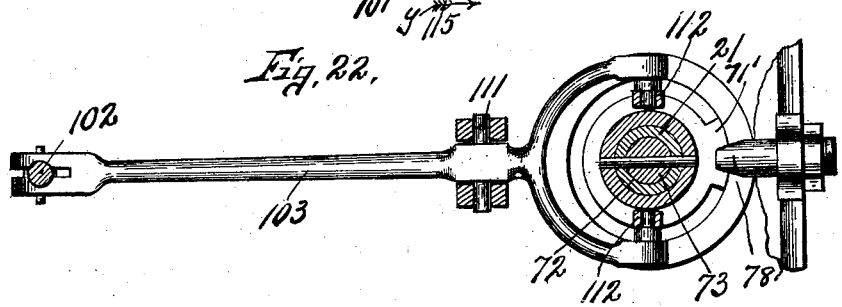

No. 738,454. PATENTED SEPT. 8, 1903.
W. W. KIMBALL & A. N. PALMER.
TIME RECORDER.
APPLICATION FILED SEPT. 11, 1901.
NO MODEL. 10 SHEETS—SHEET 10.
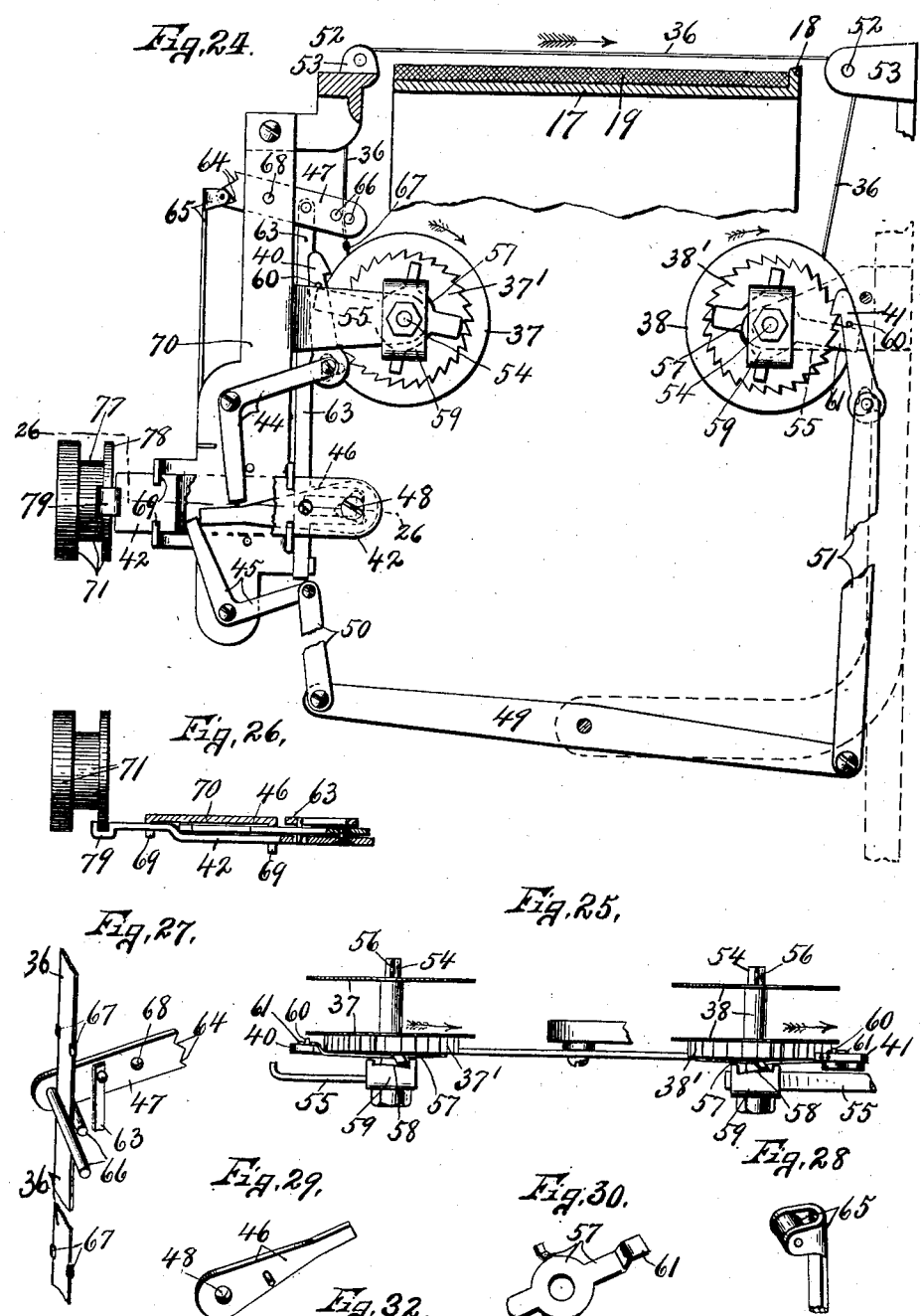

No. 738,454.

Patented September 8, 1903.

UNITED STATES PATENT OFFICE.

WILLIAM W. KIMBALL AND ANSON N. PALMER, OF SYRACUSE, NEW YORK, ASSIGNORS TO SYRACUSE TIME RECORDER COMPANY, OF SYRACUSE, NEW YORK, A CORPORATION OF NEW YORK.

TIME-RECORDER.

SPECIFICATION forming part of Letters Patent No. 738,454, dated September 8, 1903.

Application filed September 11, 1901. Serial No. 75,023. (No model.)

*To all whom it may concern:*

Be it known that we, WILLIAM W. KIMBALL and ANSON N. PALMER, both of Syracuse, in the county of Onondaga, in the State of New York, have invented new and useful Improvements in Time-Recorders, of which the following, taken in connection with the accompanying drawings, is a full, clear, and exact description.

This invention relates to improvements in time-recorders, having more particular reference to that class in which the commencement and closing time of employment may be registered by means of a single set of time-printing type-wheels coöperating with a platen and inking-ribbon.

The primary object of these several improvements is to increase the general efficiency and permanency of this class of machines and at the same time to reduce the cost of manufacture by simplifying the structure and operation of the various mechanisms.

Another object is to reduce to a minimum the load on the clock and to prevent any injurious jar, vibration, or retardation in the movement of the clock mechanism incidental to the operation of printing or variation in the force with which the hand-lever is operated.

A further object is to provide means for preventing any fraudulent registration of time by the employee and at the same time permitting the printing mechanism to be shifted in one direction at regular predetermined intervals of time.

To this end the invention consists in the combination, construction, and arrangement of the component parts of a time-recorder as hereinafter fully described, and pointed out in the claims.

Referring to the drawings, Figure 1 is a front elevation of a time-recorder embodying the various elements of our invention. Figs. 2 and 3 are respectively top plan and side elevation of the device seen in Fig. 1, the case being shown in section for disclosing the interior mechanism and most of the clock mechanism being omitted. Fig. 4 is an enlarged rear view of the interior mechanism seen in Figs. 2 and 3, the lower portion of the supporting-standards being broken away. Fig. 5 is a vertical section taken on line 5 5, Fig. 2, showing more particularly the printing mechanism and means for controlling its operation. Figs. 6, 7, 8, and 9 are detail views of the mechanism for centering the type-wheels and moving the same toward and away from the platen. Figs. 10 and 11 are respectively end and face views of the time-printing wheels. Figs. 12 and 13 are similar sectional views taken on line 12 13, Fig. 10, showing the manner of moving the hour-wheel one point at each revolution of the minute-wheel. Fig. 14 is an end view of the hour-wheel and the means provided on the minute-wheel for intermittently moving the hour-wheel one point or space. Fig. 15 is a detail view of the universal joint and yielding connection between the type-wheels and minute-hand spindle of the clock. Fig. 16 is a section taken on line 16 16, Fig. 15. Fig. 17 is a view similar to Fig. 5, showing the means for shifting the type-wheels transversely of the platen. Figs. 18, 19, and 20 are detail views of the means for controlling the return shift of the type-wheels. Fig. 21 is a detail view of the bell-ringing mechanism. Fig. 22 is a section taken on line 22 22, Fig. 3, showing the sleeve and lever which control the operation of the printing mechanism and enunciator. Fig. 23 is a detail view of the clutch which controls the operation of the printing mechanism and enunciator. Fig. 24 is a side elevation of the inking-ribbon reels and their actuating mechanisms. Fig. 25 is a top plan of portions of the mechanism seen in Fig. 24, the ribbon being omitted, showing particularly the ribbon-reels, feeding mechanism, and friction-disks for the reels. Fig. 26 is a sectional view on line 26 26, Fig. 24. Figs. 27 to 32, inclusive, are details of the parts of the ribbon-feed-controlling mechanism. Figs. 33 to 35, inclusive, are detail views of the fastening members for the record-sheet. Fig. 36 is a sectional view on line 36 36, Fig. 8.

Similar reference characters indicate corresponding parts in all the views.

This invention consists, essentially, of a platen for supporting a record-sheet, means for operating the platen, a time-printing device, clock-actuated means connected to the time-printing mechanism for synchronizing the movement of said mechanism with the clock, means for operating the printing mechanism to make an impression upon the record-sheet, an enunciator and means for controlling its action, means for shifting the time-printing mechanism transversely of the platen, and additional means for preventing the reset or shift of the time-printing mechanism or fraudulent registration upon the record-sheet.

The invention further consists in the detail construction and arrangement of the parts of the various mechanisms, as hereinafter fully described.

The various mechanisms are mounted upon a suitable frame consisting of an inclosing case 1 and an interior frame having upright front and rear standards 2 and 3, the inclosing case 1 consisting of a base 4, upright front and rear walls 5 and 6, side walls 7, and a top wall having a suitable cornice 9, the base, front, rear, top, and side walls being formed in sections suitably secured together by any desired form of fastening means adapted to firmly secure the several sections together.

In order to permit access to the interior mechanism of the time-recorder, one of the upright walls, as the rear wall 5, or one or both of the end walls 7, is movable, being adapted to be swung outwardly upon suitable hinges provided therefor. The front wall 5 of the inclosing case is preferably provided with a central circular depressed portion 10, having a circular margin 11, formed with a series of apertures 12, which are arranged in a circle at the inner edge of the margin 11 and are designated by suitable characters, as numerals "1," "2," "3," &c.—in this instance from "1" to "100"—arranged in staggered relation to each other between the perforations and outer edges of the margin 11, it being understood that there are as many apertures or perforations 12 as there are numerals. The upper central portion of the front wall is usually formed with a circular opening 13, which is arranged to receive a clock-frame 14, secured within said opening in such manner that the front face of the clock is substantially coincident with the marginal face 11 of the front wall of the inclosing case. This opening 13 extends into the margin 11, and the apertures 12 and their designating characters terminate at opposite sides of said opening 13.

Although we have shown and described a specific form of front wall of the inclosing case and the relative arrangement of the clock-frame therein, it will be evident that the inclosing case may be of any desired form, size, or construction, that the clock may be located in any other position than that described, and that any number of perforations and designating characters may be employed without departing from the spirit of this invention.

The front and rear upright standards 2 and 3 are arranged in proximity to the adjacent front and rear walls of the inclosing case and are generally united to each other by suitable upper and lower transverse bars 16.

The platen for supporting the record-sheet is revolubly supported within the inclosing case and preferably consists of a cylindrical drum 17, formed of metal or other material and provided at one end with an annular flange 18, projecting beyond the periphery of the drum, and a sleeve 19, formed of rubber or equivalent resilient material, which is mounted on the periphery of the drum with one end abutting against the annular flange 18, the sleeve 19 being arranged to support a record-sheet 20, which is also formed of substantially the same width as the face of the drum and is adapted to abut against the annular flange 18. The drum 17 is mounted upon a revoluble shaft 21 and is secured thereto by any desired fastening means, as a pin 22, which is passed through apertures in the hub 23 and shaft 21, it being apparent that this drum may be keyed to the shaft in any other manner, if desired, the particular securing means forming no part of our present invention.

The record-sheet 20 preferably consists of a strip of paper or equivalent material which is lined longitudinally and transversely, the spaces between the lengthwise lines representing the periods of time for beginning and closing work and are usually designated by printed headings—such as "Morning in," "Noon out," "Noon in," "Night out," &c.—and the spaces between the transverse lines are usually designated by numerals corresponding in number to the numbers of apertures 12 and the numerals distinguishing such apertures one from the other. This record-sheet 20 is usually of substantially the same length as the periphery of the sleeve 19, so that when the record-sheet is rolled upon the periphery of the sleeve the opposite ends of the record-sheet lie in close proximity to each other, with the rear edge of the record-sheet abutting against the flange 18, which forms a suitable guide for properly alining the record-sheet.

Any desired means may be employed for securing the meeting ends of the record-sheet to the platen, or rather to the periphery of the sleeve 19, this means preferably consisting of opposite substantially parallel gripping-plates 24, arranged transversely of and in proximity to the periphery of the platen or sleeve 19, and sliding operating members 25, also arranged transversely of the platen and adapted to operate the plates 24 independently of each other. The opposite ends of each of the plates 24 are each provided with inwardly-projecting flanges or lugs 26, having inclined slots 27, which are arranged to receive studs or shoulders 28, projecting from one of the lengthwise edges of the bars 25, these bars 25 being usually arranged transversely of and in proximity to the inner surface of the drum 17 and are held in position by a suitable plate 29, which is secured to the inner face of the drum in such manner as to hold the bars 25 in operative position and to permit the same to be moved endwise for shifting the position of the lugs 28 in the slots 27, and thereby moving the plates 24 toward and away from the periphery of the sleeve 19, the movement of said plates 24 being sufficient to permit the insertion of the opposite ends of the record-sheet between the plates 24 and adjacent portions of the sleeve 19 when the plates are moved to their outermost position by the bars 25. After the ends of the record-sheet are thus inserted the bars 25 are moved endwise in the opposite directions for drawing the plates 24 toward the periphery of the sleeve 19, thereby impinging the record-sheet against said periphery and holding the same in operative position.

The means for operating the platen consists of the shaft 21 and a hollow rotary head 30, which is revolubly supported in an opening 31 in the front standard 2 and is secured to the front end of the shaft 21, which extends through said opening, the head 30 being arranged in proximity to the front face of the inclosing case, the axis of rotation of said head and the center of the circular margin 11 being substantially coincident with each other, said head 30 being provided with an arm 32, which is pivoted thereto at 33 at one side of said axis, and its other end is provided with a handpiece 34 and a rearwardly-projecting stud 35, adapted to enter either of the apertures 12. The arm 32 and head 30 serve as a convenient means for rotating the drum 17 and the record-sheet carried thereby, the arm 32 being so arranged relatively to the spaces between the transverse lines of the record-sheet that when the stud or pin 35 is registered with any particular aperture 12 or its designating-number a corresponding number on the record-sheet is registered with the printing-point of the printing mechanism, presently described, the head 30 being also provided with a finder or pointer 30', extending beyond the stud 35 to register with said designating members, said finder having an aperture to receive and guide the stud 35.

Any suitable inking mechanism may be employed in connection with the printing mechanism for making an impression upon the record-sheet during the operation of the printing device; but we preferably employ an inking-ribbon 36, the intermediate portion of which is interposed between the printing mechanism and the record-sheet, is preferably arranged transversely of the platen, and its opposite ends are mounted upon reels 37 and 38. This inking-ribbon is adapted to be moved intermittently transversely of the platen and record-sheet during the operation of printing, the means for effecting this intermittent motion consisting of ratchet-wheels 37' and 38', pawls 40 and 41, a reciprocating bar 42, and movable means interposed between the bar 42 and pawls for actuating said pawls alternately to rotate the ratchet-wheels 37' and 38' in reverse directions. This means for effecting the reverse movement of the spools or reels 37 or 38 preferably consists of bell-crank levers 44 and 45, an oscillating pawl 46, and a rock-arm 47, connected to the pawl 46 for shifting its position to engage one or the other of the levers 44 or 45. The bell-crank levers 44 and 45 are pivoted in planes above and beneath the sliding bar 42, one of the arms of each of the levers being extended toward the sliding bar 42, and the oscillating pawl 46 is pivoted at one end at 48 to the sliding bar 42, its free end being movable into and out of the path of the adjacent arms of the levers 44 and 45, so that when the oscillating arm 46 is moved to one position and the bar 42 is reciprocated said oscillating arm will automatically rock one of the levers 44 or 45, and thereby actuate the pawl 40 or 41 connected thereto, the lever 44 being connected directly to the pawl 40 and the lever 45 being connected to the pawl 41 by a rocking lever 49 and suitable links 50 and 51. The intermediate portion of the ribbon 36 is mounted upon suitable studs or rollers 52, which are supported in brackets 53 at opposite sides or ends of the upper portion of the platen 19 and forming a portion of the supporting-frame.

The reels 37 and 38 are detachably mounted upon studs 54, secured to the supporting-arms 55 at opposite ends and preferably within the periphery of said platen, and are held in position by spring-catches 56, which are secured to the studs 54 and are adapted to be automatically depressed within a suitable slot formed in said stud when the reels are inserted upon or removed from their supporting-studs. These reels, as previously stated, are adapted to feed the ribbon in reverse directions and are automatically retarded from undue movement by suitable friction-brakes 57, which are interposed between inclined cam-faces 58, formed on suitable plates 59, Figs. 24 and 25, and are so arranged that when the feeding-reel is actuated one of the arms of its brake 57 rides upon the cam-face 58 from its lowest to its highest point, thereby increasing the friction of the spring-arm of the brake against the reel, or rather against the face of the adjacent ratchet-wheel 37' or 38'. This sliding or oscillating movement of the brake member along the inclined face 58 is facilitated or positively effected by means of a pin or shoulder 60 upon each of the pawls 40 and 41, these shoulders being adapted to engage an arm 61, forming a portion of the brake, so that when one of the pawls is moved into operative position the brake member is tensioned against the surface of the ratchet-wheel for retarding the movement of the feeding-reel, it being understood that the faces 58 are inclined in opposite directions, so that when one of the reels is feeding the brake of the other reel is automatically released by oscillating from the highest point of its cam-face 58 to the lowest point, this latter movement being effected automatically by the frictional contact or engagement of the brake-shoe with the adjacent reel. Although this movement of the brake member automatically releases the reel from which the ribbon is being fed, the friction between the brake member and reel is always sufficient to prevent any slack or looseness in the operation of the ribbon extending across the face of the platen. The pawls 40 and 41 are adapted to be brought alternately into action for rotating the reels, this alternate action being controlled by the rock-arm 47 and a link 63, connecting said arm to the oscillating member 46 in such manner that when the arm 47 is rocked the oscillating member 46 is moved alternately into registration with the bell-crank levers 44 and 45.

One end of the rock-arm 47 is provided with teeth 64, which are adapted to be engaged by a suitable detent 65, consisting of a spring-arm having a roller-bearing face arranged to engage said teeth and hold the rock-arm 47 in either of its adjusted positions. We preferably provide means for automatically shifting the position of this rock-arm as the ribbon is wound from one reel to the other, this means usually consisting of separated arms 66, provided on the rock-arm 47 for receiving the ribbon 36, said ribbon being provided with shoulders 67, secured to the edges of the ribbon in proximity to its opposite ends, which shoulders are adapted to engage the opposite faces of the arms 66 as the reels are rotated in reverse directions, and being of greater thickness than the space between said arms it is evident that the rock-arm 47 will be automatically rocked upon its pivot 68 as the ribbon reaches the limit of its movement in either direction. The sliding bar 42 is mounted in suitable guides 69, formed on a bracket 70, being actuated by a collar 71, mounted on the main supporting-shaft 21 for the platen. The shaft 21 is provided with a lengthwise opening or socket 72, in which is movable a plunger 73, adapted to be actuated lengthwise of the shaft in one direction by the operating member 32 against the action of a spring 74, also arranged in said socket. This shaft 21 is also provided with a lengthwise slot 75, and the collar 71 is mounted on the shaft and secured to the plunger 73 by a pin or equivalent fastening means 76, so that as the plunger is reciprocated in the socket 72 against the action of the spring the collar 71 is similarly moved along the shaft, this collar being provided with an annular groove 77 and a flange 78 and is rotatable with the shaft 21.

The sliding member 42 is provided with a hook-shaped extremity 79, engaged with the flange 78, whereby as the collar is reciprocated along the shaft similar motion is transmitted to the sliding bar 42 and the oscillating member 46, the spring 74 serving to retract the collar and sliding bar connected thereto. As the sliding bar 42 is moved by the operating member 32 the free end of the oscillating member 46 is moved beyond the adjacent ends of the bell-cranks 44 and 45, so as to engage the bell-crank alined therewith for operating the pawl and reels upon the return movement of the plunger by the spring 74.

The time-printing mechanism previously mentioned preferably consists of the minute-hand spindle 80, a second-spindle 81, actuated by the former spindle, type-wheels 82 and 83, operating in conjunction with the inking-ribbon 36 and platen 19, and a suitable operating mechanism, hereinafter described, for moving the type-wheels toward and away from the platen. Any desired form of clock mechanism may be employed in connection with my invention provided with the minute-hand spindle 80, having a socket in one end for receiving the adjacent end of the spindle 81, said spindle 81 being formed of sections arranged end to end and connected to each other by a universal joint 82', so that the type-wheel-supporting section may be free to move out of alinement with the other section during the operation of printing. The end of the spindle 81 adjacent to the clock mechanism is connected to the spindle 80, with a loss motion adapted to be taken up by a spring 83' for the purpose of permitting the type-wheels to be accurately centered for printing at a fixed point upon the record-sheet in a manner hereinafter described.

The spindle 81 is journaled in a rocking yoke or frame 84, pivoted at its intermediate portion at 85 to suitable brackets or standards 86, this yoke or frame 84 being provided with arms 87, having corresponding ends united and connected to and operating member 88 and their opposite ends adapted to receive and support the spindle 81, being separated from each other a sufficient distance to permit the type-wheels to be shifted along the spindle transversely of the platen in a manner and for a purpose hereinafter described.

The type-wheel 82 is provided with peripheral characters for printing the minutes upon the record-sheet, and the type-wheel 83 is provided with peripheral type for printing the hours upon the record-sheet in proximity to the minute-printing type, this hour-wheel 83 being actuated by the minute-wheel one type-space at each revolution of said minute-wheel. The printing-faces of these type-wheels are arranged in planes coincident with each other and are adapted to print at a fixed point upon the record-sheet. These type-wheels 82 and 83 are mounted directly above the upper face of the platen 17 and, together with the ribbon 36, are arranged to print at a point upon the record-sheet substantially coincident with a straight line drawn between the axes of the type-wheels and platen, it being understood that the axis of the type-wheel 83 is disposed in the same straight line between the axes of the minute-wheel and platen.

The means for actuating the hour-wheel 83 one type-space at each revolution of the minute-wheel preferably consists of an operating-arm 89, which is secured to the minute-wheel in any desired manner, its lower face being arranged to engage any one of a series of projecting shoulders or pins 90 upon the hour-wheel 83. These pins are arranged in a circle concentric with the periphery of the hour-wheel, the engaging face of the arms 89 and pins 90 being so relatively arranged that as the arm 89 is rotated by the minute-wheel its lower face or edge contacts with one of the pins and carries the hour-wheel forward a distance of one type-space, so that the printing-type of the hour-wheel is registered with one of the printing-type of the minute-wheel at the printing-point, it being understood that owing to the rotation of the two type-wheels in different arcs the lower edge of the arm 89 is arranged to leave the pin engaged thereby when the hour-wheel has been rotated one type-space, as just described, the minute-wheel continuing to rotate another revolution before the hour-wheel is again rotated, when the operation just described is repeated.

It is desirable in this class of printing mechanism to provide some means for holding the hour-wheel from vibration during the act of printing, and we therefore provide a ball or equivalent device 91, which is movable in a socket 92, formed in an arm 93, the ball 92 being normally forced outwardly by a suitable spring 94 and automatically registers with the space between the pins 90, thereby serving to hold the hour-wheel from vibratory movement during the operation of printing, which will be presently described. This hour-wheel 83 is preferably journaled in the lower end of the arm 93, being held in position by a split collar 95, which serves to permit the removal of the hour-wheel whenever desired. The upper end of the arm 93 is journaled on a sleeve 96, to which the minute type-wheel is secured, said sleeve being feathered on the shaft 81 and adapted to move transversely of the platen between the arms 87 of the yoke 84, thus forming a sliding support for the type-wheels. Although the arm 93 is journaled at its upper end on suitable ball-bearings on the sleeve 96 and the type-wheel 83 is journaled upon its lower end, said arm and type-wheel are prevented from oscillatory movement by a suitable guide 97, in this instance consisting of a slot formed in an arm 98 for receiving the projecting end of the spindle or hour-wheel, the arm 98 forming a portion of the frame of the machine and the slot or guide 97 being of sufficient length or depth to permit the type-wheels to be moved toward and away from the platen in the operation of printing upon the record-sheet. The opposite longitudinal edges of the arm 89 are preferably beveled to substantially a knife-edge, which permits said arm to readily force the ball 91 within the socket against the action of the spring 92 and out of the path of the pins 90, it being apparent that when the arm 89 is out of registration or engagement with the ball 91 said ball is automatically forced into the space between the pins for locking the hour-wheel from further rotary movement.

The means for controlling the movement of the type-wheels toward and away from the platen for printing upon the record-sheet preferably consists of the yoke 84, link 88, a spindle 99, having an eccentric 100 and a pinion 101, and a rack 102, which is actuated by a lever 103, connected to the collar 71. The link 88 is yieldingly connected to substantially the central portion of the yoke 84, being provided with a suitable buffer in the form of a spring 104, interposed between the lower face of the adjacent portion of the yoke 84 and a suitable shoulder 105 upon the link 88, so that when the yoke is rocked for forcing the type into engagement with the ink-ribbon and record-sheet the force of the printing impression is regulated by the buffer 104. The lower end of the link 88 is bifurcated or formed with a lengthwise slot extending inwardly from its lower edge for receiving a pin 106 upon the eccentric 100, said eccentric being mounted in suitable bearings 107. This pin 106 is eccentrically secured to the disk 100 and is connected to one end of a spring 108, the other end of said spring being secured to a stud 109, provided on the supporting-frame of the machine. The spring 108 serves to hold the eccentric-disk 100 in its normal or inoperative position, said spring being normally engaged with a suitable stop 109'. This eccentric-disk 100 and pinion 101 are mounted upon a crank-shaft 99, and the rack 102 is held in operative engagement with said pinion by a suitable guide or shoulder 110, so arranged that the rack may be moved to and fro for rotating the pinion and eccentric-disk against the action of the spring 108. This reciprocal movement of the rack is effected by the arm or lever 103, which is pivoted at its intermediate portion at 111 and is provided with a bifurcated extremity having roller-bearings 112 arranged in the annular groove 77 of the collar 71, so that as the collar 71 is reciprocated along the shaft 21 by means of the operating-lever 32 and plunger 73, as previously described, the lever 103 is rocked upon its pivot 111, thereby reciprocating the rack 102 and rotating the shaft 99. This rotation of the shaft 99 causes the eccentric-disk 100 to rotate against the action of the spring 108 in the direction indicated by arrow $x$ until the pin 106 is moved to the opposite side of the axis of the shaft 99 and beyond the dead-center, whereupon the spring 108 automatically completes the revolution of the shaft 99 and disk 100, which automatic movement causes the pin to engage the upper end wall of the slot in the lower end of the link 88, thereby forcibly elevating said link and rocking the yoke 84 upon its pivot 85, which in turn forces the type-wheels into engagement with the inking-ribbon and toward the platen for printing upon the record-sheet, the spring 108 and stop 109 serving to return the eccentric-disk 100 and to hold the same in its normal position until the rack and pinion are again actuated by the operating member 32 and collar 71.

The eccentric-disk 100 is preferably secured to the shaft, while the pinion 101 is loosely mounted upon said shaft and is adapted to be locked to said shaft when rotated in one direction by a clutch mechanism consisting, preferably, of a disk 113, secured to the shaft 99, and a pin 114, arranged to engage suitable shoulders 115 in the adjacent face of the pinion 101. The pin 114 is guided in a suitable aperture formed in the disk 113 and is held in operative position by a spring 116 for engaging the shoulders 115 of the pinion 101, so that as said pinion is rotated in the direction indicated by arrow $y$, Fig. 23, the disk 113, shaft 99, and disk 100 are rotated, thereby actuating the link 88 and yoke 84 to operate the printing-wheels in the manner just described.

It is thus evident from the foregoing description that the disks 100 and 113 are secured to the shaft 99 and are adapted to be rotated by the spring 108 independently of the rack and pinion and that no matter what force may be applied to the operating member 32 the impact of the type-wheels against the platen is always the same and controlled by the tension of the spring 108.

We usually provide a suitable annunciator to indicate that the printing has been effected by the type-wheels upon the record-sheet. This annunciator preferably consists of a bell 114' and a striker 115', the bell being secured to a suitable standard 116, forming a portion of the frame, and the striker 115' is mounted upon an arm 117, secured to the disk 113, the operation of this disk being similar to the operation of the eccentric-disk 100 and is effected by means of a spring 118, having one end secured to the stud 109, mounted upon the supporting-frame, and its other end connected by a link 120 to the disk 113 at one side of its center, or rather at one side of the shaft 99, so that as the shaft is rotated by means of the rack and pinion in the direction indicated by arrow $z$, Fig. 21, the disk 113 is rotated substantially a half a revolution and beyond the dead-center by said rack and pinion, whereupon the spring 118 automatically completes the revolution of the disk 113 and forcibly returns the arm 117 to its normal position, the striker 115' being mounted upon said arm with a loss of motion in such manner as to contact with the peripheral edge of the bell 114' during its movement as effected by the spring 118. It is apparent from the foregoing description that the rotation of the platen, the ribbon-feed, the printing of the type-wheels upon the record-sheet, and the operation of the annunciator are all controlled from a single operating member, as 32, this being one of the important features of our invention.

In the operation of printing upon the record-sheet it is essential that the type-wheels be properly centered to print at a fixed point, and we therefore provide the minute-wheel with a series of shoulders or projections 120', coöperating with suitable fingers 121 and 122, which are mounted upon a rock-arm 123. This rock-arm 123 is pivoted at 124 to a cross-head 125, one end of said rock-arm being provided with the fingers 121 and 122, and the other end is connected to a suitable reciprocally-movable bar 126, which is actuated by the eccentric-disk 100, this bar being provided with a roller-bearing 127, normally engaged with the periphery of the eccentric-disk 100 in such manner that as the disk is rotated in the manner previously described by the rack and pinion and spring 108 the bar 126 is automatically elevated just prior to the operation of the type-wheels in the act of printing—that is, the centering-fingers 121 or 122 are brought into action to hold the type-wheel from vibratory or rotary motion during the operation of printing.

The finger 121 is preferably fixed to the arm 123 and is adapted to enter the space between the pins 120' just previous to the operation of the type-wheels; but it sometimes happens that one of the pins 120' registers exactly with the point of the fixed finger, and we therefore provide the finger 122, which is yieldingly mounted upon the arm 123, being actuated in a slot 128 and normally held with its point beneath the lower edge of the finger 121 by a spring 129. The lower end of this finger 122 is provided with a V-shaped cut-out adapted to engage with the pin or shoulder 120', registered therewith for the purpose of centering the type to print at the fixed printing-point and hold said type-wheel from vibratory or rotary motion during the operation of printing.

As previously stated, the type-wheels are moved transversely of the platen for the purpose of printing upon the record-sheet at different intervals of time, such as "Morning in," "Noon out," "Noon in," "Night out," &c. In order to accomplish this shifting movement of the type-wheels, we provide a suitable transverse guide or support 130, upon which the cross-head 125 is mounted and adapted to be moved transversely of the record sheet or platen by means of a rotary sleeve 131, a lever 132, and a link 133, connecting one end of said lever to the cross-head 125. The sleeve 131 is journaled in the opening or bearing 31 in the front standard 2, encircles the shaft 21, and is rotatable independently of said shaft and is provided with a spiral groove or cam 135. The lever 132 is pivoted at 136 to an arm or bracket 137, forming a portion of the standard 2, said lever having its lower end provided with a roller bearing or stud 137, riding in the spiral groove 135, whereby as the sleeve 131 is rotated the lever 132 is oscillated and by means of the connection 133 serves to move the cross-head 125 along the guide 130 and transversely of the platen.

In order that the type-wheels may be moved simultaneously with the cross-head and still be free to rotate, we provide the cross-head with forked arm 98 and an additional yoke or bifurcated arm 138, the bifurcated end of the arm 98 being arranged to saddle the spindle of the hour-wheel in proximity to the arm 93 and the bifurcated end of the arm 138 being arranged to saddle the spindle 81 at opposite sides of the adjacent end of the arm 93 in such manner that the opposite forks of the bifurcated extremity of the arm 138 engage the opposite faces of the bearing for the arm 93, thereby locking the sliding supports for the type-wheels to the cross-head. The front wall 5 of the inclosing case is provided with a plate 139, arranged concentric with the collar or sleeve 131, said plate being formed with a series of characters or designations 140 and corresponding notches 141, the designating characters indicating the several periods of time at which the employee usually begins and leaves work, such as "In," "Out," "In," "Out," &c. The front end of the sleeve or collar 131 is provided with an index-finger 142, having a shoulder 143, the finger 142 being provided with a handpiece 144 and the shoulders 143 being arranged to interlock with the notches or cut-outs 141 when the finger is registered with either of the designating characters 140, it being understood that said finger is formed of spring or yielding material, which permits the shoulder to be disengaged from the notches 141 when desired to rotate the sleeve 131 by means of the handpiece 144. The plate 139 is provided with an inner groove 145 for receiving the inner end of the shoulder 143, this groove forming a depending rib upon the lower edge of the plate, in which rib is arranged the notches 141, the groove 145 being of sufficient depth to permit the shoulder to be moved inwardly to disengage the same from the notches 141 and then rotated to any position desired.

It sometimes happens that when an employee arrives at work late he purposely omits registering the time of arrival and waits until a corresponding hour later in the day, at which time—as, for instance, when leaving work and after registering his time of leaving—he resets the device for the morning hour and then prints whatever time he chooses. For instance, suppose the regular time of beginning work to be seven a. m. and the employee does not arrive until 7.30 a. m., it being customary to register a few minutes, at least, before seven a. m. if the workman is on time. Instead of registering his time of beginning he purposely omits to do so and waits until the closing hour at night, usually six p. m. He then delays the registering until, say, 6.30 p. m., at which time he registers the time of leaving, and then resets the printing-wheels to the position of "Morning in" and registers the time of arrival as 6.30 a. m. In order to obviate this fraudulent registration, we provide an oscillating bar or lever 146, which is generally concealed beneath the plate 139, being pivoted at its intermediate portion at 147, and having its opposite ends provided with shoulders 148 and 149, the shoulder 148 being arranged in proximity to the designating character indicating "Morning in," and the shoulder 149 is arranged in proximity to the noon-hour-designating character and between the "Noon-out" and "Noon-in" graduations. This lever 146 coöperates with the finger 142 or, rather, with the shoulder 143 in such manner that the shoulders 148 and 149 are adapted to be alternately engaged by the shoulder 143 of the finger 142—that is, the shoulder 148 is normally out of the path of the shoulder 143 at the starting position—as seen in Figs. 1 and 18, so that the finger 142 is free to move toward the shoulder 149 without affecting the operation of the lever 146. As the shoulder 143 engages the shoulder 149 it automatically rocks the lever and forces the shoulder 148 into the path of movement of the shoulder 143, the lever being held in this position by a spring-actuated stop 150, having a handpiece 151 at the inside of the inclosing case, whereby said stop may be withdrawn by the timekeeper or other attendant having access to the interior of the machine. It is apparent from the foregoing description that owing to the fact that the shoulder 148 is arranged between the graduations indicating the time of beginning and closing in the morning and the shoulder 149 being arranged between the graduations indicating the time of closing and beginning at noon as soon as the shoulder 143 engages the shoulder 149 the shoulder 148 prevents the return movement of the lever to its initial or starting position, the stop 150 being automatically forced into the path of movement of the end of the lever adjacent to the shoulder 148 by a spring 153.

When desired to reset the type-wheels to their initial or starting position, the timekeeper withdraws the stop 150 from the path of the movement of the lever, whereupon the finger 142 is manually returned to its normal position, it being understood that as soon as the stop 150 is withdrawn the lever 143 automatically returns to its normal position, the shoulder 149 being sufficiently weighted to effect this automatic return. In order that the centering device for the type-wheels, and particularly that for the minute-wheel, may be moved simultaneously with said wheel, we usually provide a sliding connection between the arm 123 and its operating member 126, the end of the arm 123 adjacent to the operating member 126 being provided with an elongated slot 156 for receiving a lengthwise rod or bearing 158 upon the operating member 126, this rod or bearing being of sufficient length to permit the transverse movement of the cross-head carrying the rock-arm 123. The rock-arm 123 is provided with a spring 159, which is arranged to engage the upper face of the bar 158 for the purpose of holding said bar in engagement with the lower wall of the slot 156, this arrangement permitting a slight loss motion between the operating member and rock-lever 123, the purpose of this loss motion being to compensate for the difference in movement of the centering-fingers, as previously described.

As previously stated, the clock-frame extends into the margin 11 of the front wall 5 of the inclosing case, and the apertures 12 terminate at either side of said clock-frame, or rather the opening for receiving said frame, and it is evident, therefore, that the clock-face is in the path of movement of the stud 35 of the operating member 32, and in order to prevent the operation of the lever 32 during the transit of the stud 35 across the face of the clock we provide the collar 71 with a peripheral projection or wing 71′, coöperating with a stop 78′, said wing being of sufficient circumferential length to prevent the endwise movement of the collar 71′ when the stud 35 is registered with the front face of the clock-frame.

In the operation of our invention the type-wheels are automatically actuated and synchronized with the clock mechanism, the minute type-wheels 82 being moved continuously and are provided with a number of peripheral type, in this instance sixty, corresponding to the minute-dial of the clock, the type-space representing intervals of a minute. The hour printing-wheel 83 is actuated intermittently one type-space by and at each revolution of the minute-wheel, being provided with a number of printing-type, in this instance, twelve, representing as many hours, numbered from one to twelve consecutively. In placing the record-sheet upon the platen one end of the record-sheet is inserted between one of the clamping-plates 24 and the adjacent face of the platen, and the corresponding bar 25 is then moved endwise to impinge the plate 24 against the adjacent end of the record-sheet. The record-sheet is then held against the surface of the platen with its edge abutting against the flange 18 and the platen rotated to roll the record-sheet thereon, the opposite end of said record-sheet being then inserted between the other clamping-plate 24 and the platen, whereupon the sliding bar 25 of the latter clamping-plate 24 is moved endwise to impinge said plate against said opposite end of the record-sheet, the plates 24 being substantially identical in construction, and the bars 25 are also formed in substantially the same manner.

When an employee desires to register his time of beginning or closing work upon the record-sheet, the arm 32 is rotated by means of the handpiece 34 until the stud or arm 35 is registered with the aperture having a number corresponding with the number of the employee. This operation rotates the drum or platen carrying the record-sheet, which is provided with numbers or designating characters corresponding to those upon the margin 11, so that when the arm 35 is registered with any particular number upon the dial 11 the corresponding number is presented to the printing-point of the type. The lever 32 is then rocked inwardly, the stud 35 entering the aperture alined therewith, which locks the arm and platen from further rotary movement and at the same time moves the plunger 73 endwise against the action of the spring 74. This latter movement rotates the shaft 99, carrying the disks 100 and 113, which when rotated a trifle more than half a revolution are automatically rotated the remaining portion of one revolution by the springs 108 and 118. This latter operation by the spring 108 forces the type-wheels toward the platen through the medium of the link 88 and yoke 84 and simultaneously operates the centering-fingers on the arm 123 by means of the link or bar 26. The rotation of the disk 113 by the same shaft which operates the disk 100 automatically forces the striker 115 into engagement with the bell 114, the spring 118 serving as an independent motive power for effecting this movement of the disk 113. As the plunger 73 is moved inwardly in the act of printing, the bar 42 is reciprocated by means of the sliding collar 71, which in turn operates one or the other of the bell-crank levers 44 or 45, according to which is in alinement with the oscillating arm 46, and the corresponding reel 37 or 38 is rotated one tooth at each return movement of the plunger 73 by the spring 74. This operation intermittently rotates the inking-ribbon, thereby always presenting a new surface to the type.

The operation just described is the same for different periods of time, such as the beginning of work and closing of work, and when it is desired to set the type-wheels for another period of time it is simply necessary to rotate the finger 142 one graduation—as, for instance, from "Morning in" to "Noon out"—which operation moves the type-wheels transversely of the record-sheet into registration with another lengthwise division on said record-sheet. In like manner the type-wheels may be moved from one side of the record-sheet to the other and a similar operation, such as the reverse movement of the finger 142, returns the type-wheels to their normal or initial position.

The operation of our invention will now be readily understood upon reference to the foregoing description and the accompanying drawings, and it will be noted that some change may be made in the detail construction and arrangement of the component parts of our improved time-recorder without departing from the spirit of our invention. Therefore we do not limit myself to the precise construction shown and described.

Having thus described our invention, what we claim, and desire to secure by Letters Patent, is—

1. In a time-recorder, the combination with a platen for supporting the record-sheet, of a clamping-plate and bar transversely of the platen, the bar having a sliding movement relative to the plate and connected to force the plate into and out of engagement with the record-sheet.

2. In a time-recorder, the combination with a rotary platen for the record-sheet, clamping-plates for the record-sheet having inclined bearings, and sliding bars engaged with the bearings for operating the plates.

3. The combination with a platen for the record-sheet of a time-recorder, of a clamping-plate and bar movable in different planes, one part being provided with inclined bearings, and the other with shoulders engaged with the bearings whereby the movement of one moves the other into and out of engagement with the record-sheet.

4. The combination with a platen for the record-sheet of a time-recorder, said platen being provided with a transverse guide, movable clamps for the opposite ends of the record-sheet each having its opposite ends provided with inclined slots, and sliding bars movable in the guide and having shoulders projecting into said slots for the purpose specified.

5. The combination with the frame of a time-recorder, of a rotary platen adapted to carry a record-sheet having transverse divisions and designating characters for each division, a plate or wall having a series of apertures arranged concentric with the platen and each designated by a character corresponding to the characters on the record-sheet, a rotary head connected to rotate the platen, and a handpiece pivoted to the head with a projection to enter the apertures.

6. In a time-recorder, a platen for the record-sheet, a time-printing wheel and a supporting-spindle therefor movable toward and from the platen, a spring connected to force the spindle toward the platen, and an operating member connected to force the spindle from the platen against the action of the spring, the connection between the operating member and spindle being broken automatically by the continued movement of said operating member.

7. In a time-recorder, the combination of a revoluble platen, and time-printing wheels having parallel axes, the printing-wheels being movable axially and radially relatively to the platen, ribbon-reels journaled at opposite ends of the platen between its axes and periphery and having their axes at right angles with those of the platen and printing-wheels and carrying a ribbon between the adjacent faces of the platen and printing-wheels, an operating member connected to rotate the platen and having an independent movement, means actuated by said independent movement to rotate the reels, and a spring tensioned by said independent movement of the operating member and connected to move the type-wheels toward the platen.

8. In a time-recorder, the combination with a platen and a clock-actuated spindle having a socket, a second spindle carrying a type-wheel movable toward and away from the platen, the type-wheel spindle having one end turning in said socket with a loss motion for the purpose described, and a spring for taking up said loss motion.

9. In a time-recorder, the combination with a platen and a clock-actuated spindle, a sectional spindle, one section carrying a type-wheel movable toward and away from the platen, the type-wheel spindle being connected to the clock-actuated spindle with a loss motion for the purpose described, a spring for taking up said loss motion, and a universal joint between the type-wheel and clock-spindle and connecting the ends of the sectional spindle.

10. In a time-recorder, the combination with a platen, of a time-printing device movable toward and from the platen, a spring operatively connected to move said printing device toward the platen, and manually-operated means operatively connected to tension the spring and to disconnect therefrom after the spring is tensioned.

11. In a time-recorder, the combination with a platen, of a clock-actuated sectional spindle, one section being movable radially toward and from the platen and connected to the other section with a loss motion, a spring connected to take up the loss motion a type-wheel mounted upon the radially-movable spindle-section and rotating therewith, stop-shoulders on the type-wheel, and means engaging the stops to center the type at the printing-point.

12. In a time-recorder, the combination with a time-printing wheel, a second printing-wheel provided with stops, a holding device to engage the stops, and means on the former wheel to force said device from its operative position and to engage the stops and rotate the second wheel step by step.

13. In a time-recorder, the combination of a clock-actuated minute-printing wheel, an hour-printing wheel provided with stops, a movable member projecting between the stops to hold the type of the hour-wheel at the printing-point, and a projection on the minute-wheel operating to displace the holding device and to successively engage the stops to move the hour-wheel step by step.

14. A printing mechanism for time-recorders comprising a platen and inking-ribbon, a time-controlled type-wheel movable toward and from the platen, a spring connected to move the type-wheel toward the platen and manually-operated means operating to tension the spring, said spring acting independently of said means to move the type-wheel toward the platen.

15. In a time-recorder, the combination with a platen, of a time-printing wheel movable toward the platen, a rotary member operatively connected to move the type-wheel toward the platen, and means actuated by the rotary member to hold the type-wheel from vibratory movement during the operation of printing.

16. A printing mechanism for time-recorders comprising a platen and inking-ribbon, a time-controlled type-wheel movable toward the platen, a rotary member connected to move the type-wheel toward the platen, means to rotate said member and automatically-operated means controlled by the rotary member and operating simultaneously therewith for centering the type to print at a fixed point.

17. A printing mechanism for time-recorders comprising a platen and inking-ribbon, a time-controlled type-wheel movable toward the platen, a spring-actuated eccentric connected to actuate the type-wheel toward the platen, and manually-operated mechanism to rotate the eccentric to tension the spring, the eccentric being movable by the spring independently of said mechanism for the purpose set forth.

18. A printing mechanism for time-recorders comprising a platen and inking-ribbon, a time-controlled type-wheel movable toward the platen, means to move the type-wheel toward the platen, a device for centering the type to print at a fixed point, and a spring-actuated eccentric rotated by said means to tension the spring, said eccentric being automatically actuated by the spring independently of said means to operate the type-wheels toward the platen.

19. In a time-recorder, the combination of a platen and an inking-ribbon, a clock-actuated spindle movable toward and from the platen, a time-printing wheel on the spindle, a rotary member connected to move the spindle toward the platen, a spring actuating said member, a bell, a striker for the bell, a spring to operate the striker, and means to tension and release the springs.

20. A printing mechanism for time-recorders comprising a platen and inking-ribbon, a time-controlled type-wheel movable toward the platen, means to move the type-wheel toward the platen, a bell, a spring-actuated eccentric having a striker for the bell, the eccentric being partially rotated by said means to tension the spring and the spring serving to further rotate the eccentric independently of said means to operate the striker against the bell.

21. A printing mechanism for time-recorders comprising a platen and ink-ribbon, a rock-arm having a time-controlled type-wheel journaled thereon and adapted to move the type-wheel toward the platen, the type-wheel being provided with a series of centering-points, a second rock-arm having a fixed finger and a movable finger, the fixed finger being movable between the points and the movable finger being arranged to engage a single point to center the type-wheel and hold the same from vibratory movement during the act of printing, a rotary eccentric connected to the rock-arms, a bell, an additional eccentric having a striker for the bell, means for simultaneously and partially rotating the eccentrics, and springs for further rotating the eccentrics to operate the rock-arms and striker independently of said means.

22. A printing mechanism for time-recorders comprising a platen, a rocking frame fixed from endwise movement, a clock-actuated sectional spindle having one of its sections journaled on the frame, a type-wheel feathered on the section on the frame, and manually-operated means operatively connected to rock the frame in one direction only.

23. A printing mechanism for time-recorders comprising a platen, a rocking frame fixed from endwise movement, a clock-actuated sectional spindle having one of its sections journaled on the frame, a type-wheel feathered on the section on the frame, and manually-operated means operatively connected to rock the frame in one direction only and a spring operatively connected to rock the frame in the opposite direction.

24. A printing mechanism for time-recorders comprising a platen, a rocking frame fixed from endwise movement, a clock-actuated sectional spindle having one of its sections journaled on the frame, a type-wheel feathered on the section of the frame, and manually-operated means operatively connected to rock the frame in one direction only, a centering device to hold the type-wheel from vibratory movement while printing, and a spring operatively connected to rock the frame in the opposite direction and to simultaneously bring the centering device into action.

25. A printing mechanism for time-recorders, comprising a platen and inking-ribbon, a rock-arm having a clock-actuated spindle journaled thereon, means to rock the arm, a type-wheel feathered on the spindle, a second arm depending from the spindle and movable lengthwise of said spindle with the type-wheel, a second type-wheel journaled on the arm and rotated one type-space at each revolution of the former type-wheel, a sliding cross-head connected to move the type-wheels and second arm, and rotary means connected to the cross-head for actuating the same.

26. A printing mechanism for time-recorders, comprising a platen and ink-ribbon, a rotary shaft carrying a platen, time-controlled type-wheels movable transversely of the platen and having an independent movement toward and away from the platen, means for moving the type-wheels toward the platen, and a rotary cam mounted on the shaft and rotatable independently thereof and connected to move the type-wheels transversely of the platen for the purpose set forth.

27. In a time-recorder, the combination with a rotary shaft having a platen for the record-sheet, a clock-rotated spindle parallel with the shaft and movable toward and away from the platen, a type-wheel feathered on the spindle, a collar movable endwise on the shaft and connected to control the movement of the spindle toward the platen, an operating member connected to rotate the shaft and to actuate the collar endwise, a cam encircling the shaft and rotatable independently thereof, and connections between the cam and type-wheel for moving said type-wheel endwise for the purpose specified.

28. In a time-recorder, the combination of a revoluble shaft, a platen secured to the shaft, clock-rotated type-wheels movable transversely of the platen, a rocking sleeve on the shaft movable independently of said shaft and connected to move the type-wheel axially as it is rotated, and a gravity-pawl coöperating with said means to prevent the return of the sleeve from its normal or starting position.

29. In a time-recorder the combination with a platen and a clock-actuated type-wheel movable transversely of the platen, a rotary supporting-shaft for the platen, an independently-revoluble member encircling the shaft and connected to move the type-wheel transversely of the platen, an arm secured to said member and provided with a stop-shoulder, a pawl adapted to move automatically into the path of said shoulder as the member is rotated, and movable means for holding the pawl in operative position for the purpose set forth.

30. In a time-recorder, the combination with a circular dial, of a rotary shaft having a platen and a lever movable around the dial, time-printing wheels movable transversely of and from the platen, means upon and movable lengthwise of the shaft and connected to control the movement of the printing-wheels toward the platen, and a stop for engaging said means and preventing the operation of the lever in certain positions of its rotary movement for the purpose described.

31. In a time-recorder, a platen, two rock-arms, one being fixed from axial movement and the other movable axially, a clock-actuated spindle on the first-named rock-arm, a type-wheel feathered on the spindle, and centering means for the type-wheel on the axially-movable rock-arm.

32. In a time-recorder, a platen, two vertically-rocking arms, a time-printing wheel revolubly mounted on one of the arms, a centering device on the other arm, a spring operatively connected to rock both of the arms in one direction, and means to tension the spring.

33. In a time-recorder, the combination with a platen and a clock-rotated type-wheel movable toward and from the platen and provided with stop-shoulders, of a centering device movable into and out of engagement with said shoulders, a spring operatively connected to move the centering device into engagement with the shoulders, and means to tension the spring.

34. In a time-recorder, the combination with a platen and a time-printing wheel movable toward and from the platen, an alarm including a striker, a spring operatively connected to move the type-wheel from the platen, a second spring operatively connected to actuate the striker, and a manually-operated plunger operatively connected to tension both of the springs and to break connection with the springs after the same are tensioned.

35. A printing mechanism for time-recorders comprising a platen, a centrally-pivoted rocking frame carrying at one end a spindle, a clock-motor connected to actuate the spindle, spring-actuated means connected to the other end of the rocking frame to rock the same and move the spindle toward and away from the platen, a sleeve feathered on the spindle, a type-wheel and an arm mounted on the sleeve, a second type-wheel journaled on the arm, means for moving the sleeve lengthwise of the spindle, and additional means connected to the spring-actuated means with a loss motion for tensioning the spring, said spring actuating the rocking frame independently of said additional means.

36. In a time-recorder, a revoluble shaft carrying a platen and provided with a hand-lever to rotate the shaft and platen, said lever having an independent axial movement, printing mechanism including means actuated by the axial movement of the lever, a clock-dial and clock mechanism connected to actuate the printing-wheels, a second dial having a circular row of employee-designating characters terminating at opposite sides of the clock-dial, the free end of the lever being movable across the face of the clock-dial and means for preventing the axial movement of the lever during its movement across the face of the clock-dial.

37. In a time-recorder, a dial having apertures, a rotary platen and an operating member therefor having a stub to enter the apertures, and a finder between the movable member and dial and movable with the operating member around the dial for the purpose specified.

38. In a time-recorder, the combination with a revoluble platen and means to rotate it, of a rocking frame, means to rock the frame, a clock mechanism, a sectional spindle, one section being mounted revolubly upon one end of the rocking frame, a hollow spindle receiving the other section of the former spindle and driven by the clock mechanism, a universal joint or coupling connecting the adjacent ends of the sections of the sectional spindle and yielding means connecting the hollow spindle with the adjacent section of the sectional spindle.

39. In a time-recorder, revoluble clock-actuated spindles each having radial ways disposed in intersecting planes, one spindle being movable radially relatively to the other, and an intermediate member having opposite faces engaged with and guided in said ways for the purpose described.

40. In a time-recorder, a dial having an inner circular row of apertures and an outer concentric row of designating characters, a revolving shaft carrying a platen-arm having a stud to enter the apertures, and a finder revoluble with the arm and extending beyond apertures for the purpose described.

41. In a time-recorder, the combination with a platen, of a clock-actuated spindle composed of sections arranged end to end, one section having a radial movement toward and from the platen, a type-wheel feathered on the movable section, a rotary member connected to move said section toward the platen, a spring to actuate the rotary member, for the purpose described, and means to tension and to release the spring.

42. In a time-recorder, the combination with a revoluble shaft carrying a platen, a clock mechanism, a rocking frame carrying at one end a revoluble spindle, a universal joint connecting the spindle to the clock mechanism, a minute printing-wheel feathered on the spindle, an arm depending from the spindle and carrying an hour-wheel, a lever connected to rotate the shaft and having an independent axial movement relative to the shaft, a spring-actuated member connected to and operated by the axial movement of the lever, centering pins or studs on the minute-wheel, a rock-arm carrying centering-fingers coacting with said pins or studs to hold the type of the minute-wheel at a printing-point, said rock-arm and rocking frame being operated simultaneously by the spring-actuated member independently of the lever for the purpose described.

43. In a time-recorder, the combination of a rotary shaft carrying a platen, an ink-ribbon movable axially of a shaft across the face of the platen, an operating-lever secured to the shaft and having an independent axial movement, mechanism actuated by the axial movement of the lever for moving the ribbon, a rocking frame carrying a rotary spindle, a clock mechanism connected to actuate the spindle, sleeves feathered on the spindle, type-wheels carried by the sleeve, studs on one of the type-wheels, a centering device coöperating with said studs to hold the type at the printing-point and annunciator, a rotary member connected to actuate the rocking frame, centering device and annunciator, connections between the sleeve and lever for moving the sleeve axially by the axial movement of the lever, and additional connections for transmitting rotary motion to the rotary member by the axial movement of the lever.

In witness whereof we have hereunto set our hands this 28th day of August, 1901.

WILLIAM W. KIMBALL.
ANSON N. PALMER.

Witnesses as to W. W. Kimball:
  HOWARD P. DENISON,
  MILDRED M. NOTT.
Witnesses as to A. N. Palmer:
  F. D. OLIVER,
  C. W. PALMER.